United States Patent
Lugones et al.

(10) Patent No.: US 10,862,766 B2
(45) Date of Patent: Dec. 8, 2020

(54) CONTROLLER FOR A CLOUD BASED SERVICE IN A TELECOMMUNICATIONS NETWORK, AND A METHOD OF PROVIDING A CLOUD BASED SERVICE

(71) Applicant: Alcatel Lucent, Boulogne Billancourt (FR)

(72) Inventors: Diego Lugones, Blanchardstown (IE); Jesus Omana Iglesias, Blanchardstown (IE); Thomas Voith, Kornwestheim (DE); Stefanie Braun, Stuttgart (DE); Jordi Arjona Aroca, Blanchardstown (IE); Joachim Riemer, Stuttgart (DE); Volker Hilt, Stuttgart (DE); Jurgen Sienel, Stuttgart (DE)

(73) Assignee: Alcatel Lucent, Nozay (FR)

( * ) Notice: Subject to any disclaimer, the term of this patent is extended or adjusted under 35 U.S.C. 154(b) by 72 days.

(21) Appl. No.: 16/060,675

(22) PCT Filed: Dec. 9, 2016

(86) PCT No.: PCT/EP2016/080467
§ 371 (c)(1),
(2) Date: Jun. 8, 2018

(87) PCT Pub. No.: WO2017/097992
PCT Pub. Date: Jun. 15, 2017

(65) Prior Publication Data
US 2018/0278485 A1   Sep. 27, 2018

(30) Foreign Application Priority Data
Dec. 11, 2015 (EP) .................................. 15306988

(51) Int. Cl.
*H04L 12/24* (2006.01)
*H04L 12/911* (2013.01)
(Continued)

(52) U.S. Cl.
CPC ........ *H04L 41/145* (2013.01); *H04L 41/0896* (2013.01); *H04L 43/0817* (2013.01);
(Continued)

(58) Field of Classification Search
CPC ....... H04L 41/145; H04L 47/22; H04L 29/08; H04L 41/0896; H04L 47/76; H04L 47/70;
(Continued)

(56) References Cited

U.S. PATENT DOCUMENTS 9,363,154 B2 * 6/2016 Akolkar ................ H04L 41/147
2004/0186826 A1   9/2004 Choi et al.
(Continued)

FOREIGN PATENT DOCUMENTS

| CN | 1761962 A | 4/2006 |
| CN | 101937359 A | 1/2011 |

(Continued)

OTHER PUBLICATIONS

Rashid Mijumbi et al., "Network Function Virtualization: State-of-the-art and Research Challenges," IEEE Communications Surveys & Tutorials, XP055239665, pp. 1-28, 2015.
(Continued)

*Primary Examiner* — Shirley X Zhang
(74) *Attorney, Agent, or Firm* — Fay Sharpe LLP (57) ABSTRACT

A controller is provided for a Cloud based service handling multiple types of traffic in a telecommunications network, the controller comprising: a first stage configured to automatically model use of Cloud resources allocated to the service for specific workloads of each of a plurality of traffic types, so as provide a variety of models for each traffic type; a second stage configured to automatically reduce the number of and generalise the models so as to provide generalised models for each traffic type applicable to other workloads than the specific loadings; a third stage configured to auto-
(Continued)

matically evaluate accuracy of the generalised models for various combinations of given workloads, in each combination each of the given workloads being of a corresponding traffic type, and to select one of the generalised models dependent upon evaluated accuracy; and a fourth stage configured to control operation of the Cloud resources according to the selected model.

14 Claims, 3 Drawing Sheets

(51) Int. Cl.
*H04L 12/917* (2013.01)
*H04L 12/927* (2013.01)
*H04L 12/26* (2006.01)
*H04L 29/08* (2006.01)

(52) U.S. Cl.
CPC .............. *H04L 47/76* (2013.01); *H04L 47/78* (2013.01); *H04L 47/803* (2013.01); *H04L 47/823* (2013.01); *H04L 67/10* (2013.01)

(58) Field of Classification Search
CPC ......... H04L 47/78; H04L 47/80; H04L 47/82; H04L 67/10; G06F 9/45533; G06F 9/50
USPC ........................................ 709/223, 224, 220
See application file for complete search history.

(56) References Cited

U.S. PATENT DOCUMENTS

| | | | |
|---|---|---|---|
| 2005/0021530 A1* | 1/2005 | Garg ..................... G06F 9/505 |
| 2012/0116743 A1* | 5/2012 | Ayala ..................... G06F 16/25 |
| | | | 703/13 |
| 2013/0185729 A1 | 7/2013 | Vasic et al. | |
| 2014/0089509 A1 | 3/2014 | Akolkar et al. | |
| 2015/0229582 A1* | 8/2015 | Zhu ..................... H04L 47/762 |
| | | | 709/224 |
| 2015/0234670 A1* | 8/2015 | Shimogawa ........ G06F 9/45533 |
| | | | 718/1 |
| 2015/0295808 A1* | 10/2015 | O'Malley ............... H04L 47/22 |
| | | | 709/224 |
| 2015/0326535 A1* | 11/2015 | Rao ..................... H04L 41/5054 |
| | | | 726/15 |
| 2016/0328273 A1* | 11/2016 | Molka ..................... G06F 9/505 |

FOREIGN PATENT DOCUMENTS

| | | | | |
|---|---|---|---|---|
| CN | 102256266 A | 11/2011 | | |
| CN | 103403682 A | 11/2013 | | |
| CN | 104301403 A | 1/2015 | | |
| EP | 2 615 803 A2 | 7/2013 | | |
| EP | 2615803 A2 * | 7/2013 | ............ H04L 43/08 |
| EP | 2615803 B1 * | 3/2017 | ........... H04L 67/303 |

OTHER PUBLICATIONS

International Search Report for PCT/EP2016/080467 dated Feb. 7, 2017.

* cited by examiner

CONTROLLER FOR A CLOUD BASED SERVICE IN A TELECOMMUNICATIONS NETWORK, AND A METHOD OF PROVIDING A CLOUD BASED SERVICE

FIELD OF THE INVENTION

The present invention relates to telecommunications, in particular to a controller for a Cloud based service in a telecommunications network, and a method of providing a Cloud based service.

DESCRIPTION OF THE RELATED ART

Deployment of infrastructure has traditionally involved relatively long timescales, typically of the order of months, given the work involved in capacity planning, engineering decisions, and testing of usually rigid and specialized equipment (for example appliances) which are, in most cases, impractical to repurpose for different contexts or services. Usually, this involves static and inefficient over-engineering of resources, often including additional active and inactive standby resources for failover (in other words automatically switching to back-up systems) in fault scenarios or disasters.

Virtualization using general-purpose servers has been a significant step towards a more agile deployment and service migration. However, it is just the beginning.

Known approaches to using Cloud capabilities and features go beyond simply executing virtualized services on commodity hardware to significantly more efficient automation. For instance, such Cloud capabilities as service consolidation, elasticity, live migration, on-demand provisioning and orchestration allow telecommunications providers to allocate resources in advance in a dynamic and predictive manner, to meet anticipated demands, as well as automatically handle unexpected traffic surges in a prioritized and efficient manner.

However, these advantages of known approaches come at a cost: on-boarding, deploying and orchestrating services on a Cloud is complex and time consuming. A substantial development effort is needed for configuration, integration and testing in a Cloud environment including defining dependencies between components of a service, setting thresholds for scaling the service, and identifying resource requirements. This complexity added by the Cloud stack makes today's on-boarding and configuration processes (in other words of hardware, software, services, and features) both difficult and expensive.

There is a collection of known techniques, which are usually employed to ensure the availability of resources in a Cloud service. The most relevant are the following:

a) Overprovisioning: The resources enabled for the service are enough to serve the maximum expected load at any moment. This results in a typical average use below 10-15%. Therefore, this solution is expensive since these extra resources could be used by other services (i.e. there is an opportunity cost) or the service could be scaled down (i.e. reducing CAPEX). This approach is not dynamic and automated.

b) Reactive techniques: Typically in this approach, the states of Cloud entities of a service are tracked separately. When any of them hits a respective given threshold, the entity is scaled. The main problems of this approach are: i) setting these thresholds requires expert knowledge of the service and manual adjustments and is time consuming and error prone, ii) Services dependencies are not considered between cloud entities as only resource metrics (e.g. CPU (Central Processing Unit utilisation), MEM (memory utilisation)) of the individual components are measured, so there are no service metrics involved.

c) Proactive Techniques: The approach here is to try to predict the amount of resources that will be used by the system based on historical service records. Given that a perfect prediction is not possible, there will be cases when this approach falls into overprovisioning when the demand is below that expected, or into reactive mode because of overloads.

d) Rule-based Techniques: This is considered the best of the known approaches in terms of performance, but is only possible if the complexity of the system is very low; unfortunately this is not the case for most Cloud based services, in particular complex telecommunications services composed of various distributed resources allocated to various service chains.

SUMMARY

The reader is referred to the appended independent claims. Some preferred features are laid out in the dependent claims.

An example of the present invention is a controller for a Cloud based service handling multiple types of traffic in a telecommunications network, the controller comprising:

a first stage configured to automatically model use of Cloud resources allocated to the service for specific workloads of each of a plurality of traffic types, so as provide a plurality of models for each traffic type;

a second stage configured to automatically reduce the number of and generalise the models so as to provided generalised models for each traffic type applicable to other workloads than the specific workloads;

a third stage configured to automatically evaluate accuracy of the generalised models for various combinations of given workloads, in each combination each of the given workloads being of a corresponding traffic type, and to select one of the generalised models dependent upon evaluated accuracy; and a fourth stage configured to control operation of the Cloud resources according to the selected model.

Preferably the third stage is also configured to adapt the selected model by at least one correction factor dependent on the combinations of workloads.

Preferably the third stage identifies workload ranges within which the service operates without additional Cloud resources.

Preferably the controller instructs adjustment of the Cloud resources provided by Cloud entities for the service dependent upon workloads anticipated for the service. Preferably in operating the Cloud resources the controller instructs adjustment of the Cloud resources provided by the Cloud entities for the service dependent upon the selected model and the workloads anticipated for the service.

Preferably the controller instructs adjustment of the Cloud resources by instructing at least one of increasing/decreasing resources assigned to cloud entities and increasing/decreasing the number of cloud entities. Preferably the controller instructs at least one of increasing resources assigned to cloud entities and increasing the number of cloud entities, in the event that a throughput bottleneck is anticipated for the service. This may be done by instructing a Cloud Application Programming Interface to increase the number of cloud entities for the service.

Preferably the service is provided by virtual network functions, VNFs, each having at least one corresponding Cloud entity.

Preferably said traffic types comprise messaging, audio and video traffic types.

Preferably the controller is connected to, and configured to control, a workload tester, which is operative to apply the workloads to the Cloud resources and send data to the controller.

Preferably the controller uses resource data and service data to provide the models which relate workload to Cloud resource usage. Preferably the resource data comprises at least some of CPU utilisation and memory utilisation, disk space, and network configuration. Preferably the service data comprises at least one of number of error messages indicating overload in a period and number of calls processed in a period. Preferably the third stage is configured to receive the data from at least one or both of, a cloud Application Programming Interface and a Service Application Programming Interface, to adapt the reduced number of generalised models to provide the selected model.

Preferably the service is an Internet Protocol, IP, Multimedia Subsystem, IMS, service.

Alternatively preferably the service is an N-tiers service, for example Content Distribution Network or oneApp service.

Some preferred embodiments provide a method and controller to automate the profiling, scaling and control of cloudified services. These enable quality of service expectations, for example as defined in service level agreements (SLAs), to be met, and allow variations in demand for the Cloud based service to be dynamically coped with.

Some preferred embodiments provide an intelligent automaton (sometimes referred to as an automata) that automatically profiles the telecommunication service to obtain a representative model (or set of models) and its limits. With the automaton, configuration and deployment of telecommunications systems in a Cloud is substantially simplified and moves towards a human-assisted and/or fully autonomous process. Using the intelligent automaton may reduce the complexity of service deployment in a Cloud environment and the time needed for that service deployment.

Some preferred embodiments include four phases that are achieved automatically (in contrast to known approaches where manual intervention is required) namely: 1) On-line profiling and modelling 2) Model optimisation and reduction of number of models 3) Inteference modelling and 4) model-based operation.

In some preferred embodiments, after the service model is learnt the automaton is able to operate the service and determine when and how to scale up (increase the resources assigned to Cloud entities), scale out (increase the number of Cloud entities) or scale down (i.e., decrease the aggregated capacity) of the service.

Some preferred embodiments provide a framework that is able to autonomously profile and model a complex telecommunications service running in a Cloud platform. This model is used to automatically control (or operate) such a service.

Some preferred embodiments involve automated modelling based on observed measurement data. In these embodiments, when generating the system model, different model families are use as a baseline and then one that best adjusts to the service under evaluation is found. In the case of a telecommunications Cloud based service, the resulting model contains attributes such as the various dependencies of virtual network functions (VNFs) on resources for given loads in the service, the interdependences of VNFs, and how many instances of each VNF should be running at each moment for any given input or workload. In these embodiments, the model is then used to control the service and accurately decide on the number of Cloud instances (where VNFs reside) at any moment. Model-based control allows for avoiding bottlenecks by enlarging the dynamic operation area through scaling when required.

Some preferred embodiments reduce or remove the complexities that come with the deployment and orchestration of software components in a Cloud environment. Service providers are enabled to quickly deploy new services, change existing services, add or remove elements to/from a service and deploy services in very different environments. Some preferred embodiments may be considered as a Cloud orchestration system which can automatically detect the appropriate configuration for a specific service in a specific environment and adjust the service accordingly.

Some preferred embodiments enable quick and easy service deployment and continuous optimisation of services, and remove the need for time-consuming service provisioning tasks, such as the programming of configuration scripts for each service, the manual creation of scaling rules for each virtual machine, the conservative guessing of configuration parameters to ensure services run in all possible environments, and the suboptimal performance caused by inattention to application dependencies and context.

Some preferred embodiments reduce the time it takes to deploy new services, change existing services, add or remove elements to/from a service and deploy services in very different environments.

Some preferred embodiments provide: a framework that automatically profiles the relationship between service's traffic and resource utilization and ultimately creates a set of models that capture the overall behavior of the service that the developer wants to deploy; a system identification approach that can creates several models for a single service and ultimately selects the most appropriate; and an automatic approach that right sizes the amount of Cloud entities necessaries to handle the incoming/forecasted input traffic.

Some preferred embodiments enable automatic configuration and deployment of a Cloud service in a specific environment and under a given policy and Service Level Agreement (SLA) constraints. In contrast, known approaches require substantial amount of manual configuration that is time consuming and error phrone.

Some preferred embodiments provide the automatic right sizing of N-tier services that may be used for a telecommunications or other type of service in general.

Some preferred embodiments provide an automation framework which uses measurements and self learning algorithms.

Examples of the present invention also relates to corresponding methods.

Another example of the present invention relates to a method of providing a Cloud based service handling multiple types of traffic in a telecommunications network, the method comprising:

automatically modelling use of Cloud resources allocated to the service for specific workloads of each of a plurality of traffic types, so as provide a variety of models for each traffic type;

automatically reducing the number of, and generalising, the models so as to provide generalised models for each traffic type applicable to other workloads than the specific workloads;

automatically evaluating accuracy of the generalised models for various combinations of given workloads, in each combination each of the given workloads being of a corresponding traffic type, and selecting one of the generalised models dependent upon evaluated accuracy; and operating the Cloud resources according to the selected model.

BRIEF DESCRIPTION OF THE DRAWINGS

An embodiment of the present invention will now be described by way of example and with reference to the drawings, in which.

DETAILED DESCRIPTION

The inventors realised that an automation framework may be provided that is able to autonomously profile and model a complex telecommunications service running in an arbitrary Cloud platform. This model is used to automatically control (in other words operate) such a Cloud-based service (sometimes known as a cloudified service).

The inventors realised that an approach of automated modelling based on observed measurement data could be used. They realised it was possible, when generating the system model, to use different model families as a baseline and then find the one that best adjusts to the service under evaluation. In the case of a telecommunications service, the resulting model contains attributes such as the different dependencies between the virtual network functions (VNFs) in the service, or how many Cloud entities (also known as Cloud instances) (where VNFs reside) should be running at each moment for any given input or workload. The model is then used to control the service and accurately decide on the right number of Cloud instances needed at any moment. The inventors realised that this model-based control allows bottlenecks to be avoided by enlarging the dynamic operation area through scaling when required.

Figure 1:
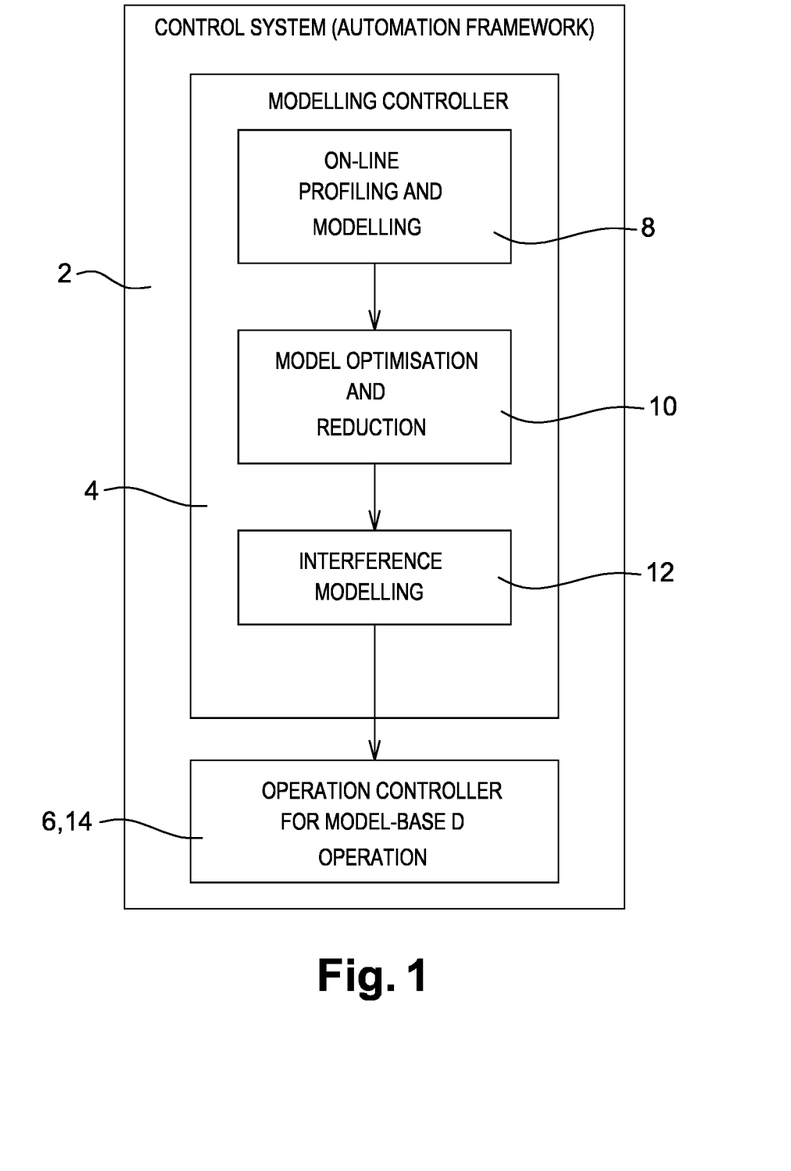
FIG. 1 is a diagram illustrating the overall control system also known as the automation framework or automaton.

As shown in FIG. 1, the automation framework 2 consists of a modelling controller 4 connected to an operation controller 6.

The automation framework 2, also known as an automaton or a control system, requires as input basic information about the service and the expected performance. This information includes the expected Service Level Agreement, type of traffic (for example SIP, RTP or HTTP), and basic information about connectivity of virtual network functions (VNFs). The automation framework 2 may be considered as divided into four stages, namely an On-line Profiling-and-Modelling stage 8, a Model-Optimisation-and-Reduction stage 10, an Interference-Modelling stage 12 and model-based-Operation 14.

The modelling controller 4 includes the On-line-Profiling-and-Modelling stage 8, the Model-Optimisation-and-Reduction stage 10, and the Interference-Modelling stage 12. The operation controller 8 provides the model-based-operation stage 14.

Before considering them in more detail, let us first summarise these four stages as follows:

1) In the Online-Profiling-and-Modelling stage 8, various tests are made to learn the service behaviour/model and its limits (i.e. the operational domain within which the service behaves as expected) for various traffic types. To run these tests, the Online-Profiling-and-Modelling stage 8 of the modelling controller 4 uses workloads of actual traffic or existing pre-recorded traffic, or generates other workloads that are put on the service at specific times. In this phase, the Online-Profiling-and-Modelling stage 8 stresses the service and learns about how metrics of the different virtual network functions (VNFs) evolve with respect to the varied load. For example, service metrics are captured in order to detect the occurance of service errors. At the end of this phase the modelling controller 2 has a number of models that describe the VNF behaviour for the injected workloads.

2) In the model optimisation and reduction stage 10, the models and limits obtained in the first phase are combined and generalized for arbitrary workloads.

3) In the Interference Modelling stage 12, the accuracy of the models is evaluated against a set of heterogeneous workloads. The interference is measured for different workload combinations and included in the model.

4) In the operation controller 6, model-based operation occurs in which where the automation framework 2 operates the service using the determined model. This operation is meant to keep the service inside the limits of the operational domain so that no bottlenecks occur. Therefore, the controller 6 will act on the service every time a Cloud instance is close to a bottleneck, for example by scaling out the number of Cloud instances of a virtual network function (VNF) so as to enlarge its operational domain of expected behaviour. To explain more generally, after the service model is learnt the automaton is able to operate the service and determine in good time when and how to scale up (increase the resources assigned to Cloud entities), scale out (increase the number of Cloud entities) or scale down (i.e., decrease the aggregated capacity) of the service.

We turn now to consider these four stages in more detail.
Modelling Controller

Figure 2:
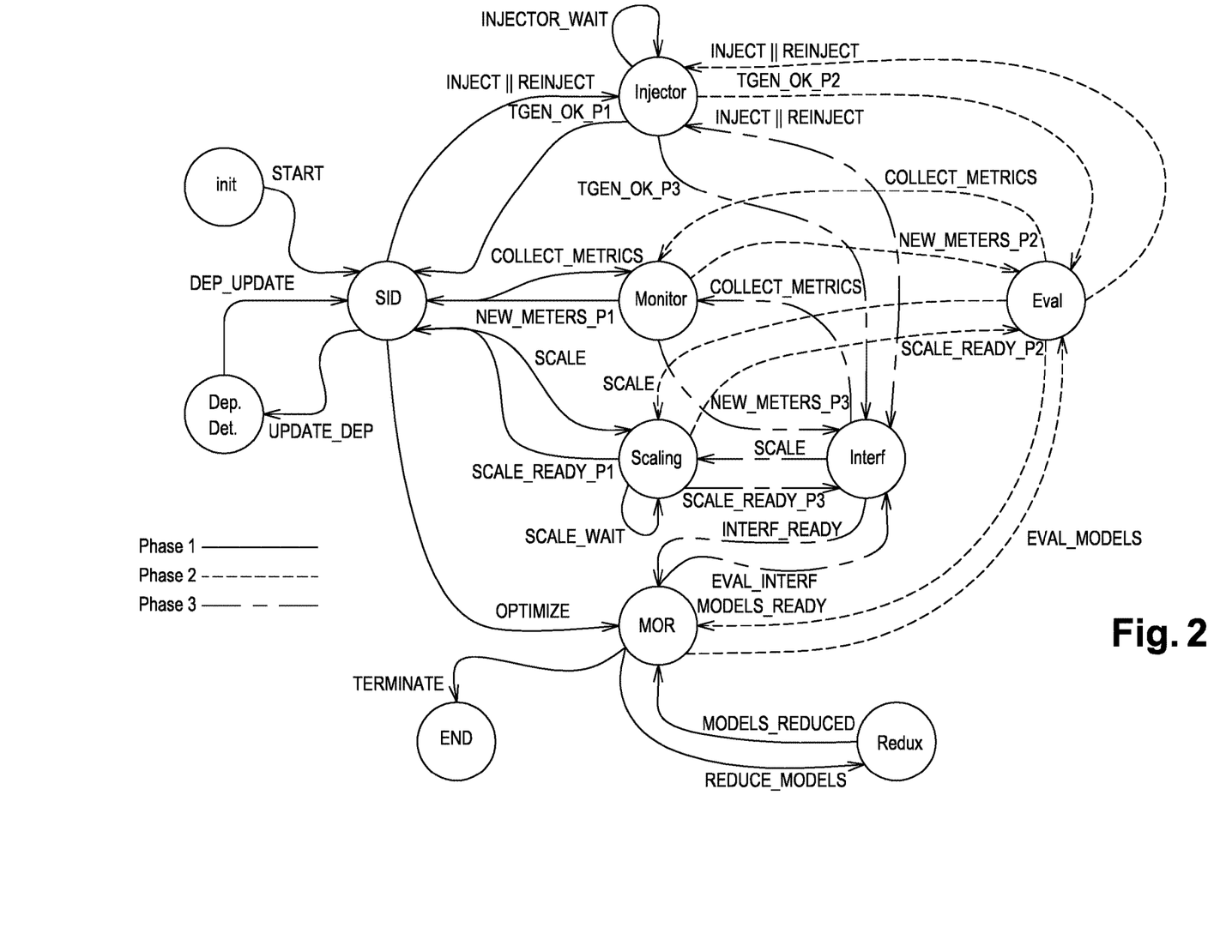
FIG. 2 is a finite state machine diagram illustrating in more detail the online profiling and modelling stage of the control system shown in FIG. 1.

In this example the automation framework 2 is run on System Identification (SID) mode, where SID is an approach that consists of evaluating different model families typically based on regressions such as Autoregressive model (ARX), Autoregressive moving—average model (ARMAX), Box-Jenkins, Non-linear Autoregressive moving—average model (NARMAX), etc. and finding the model family that best adjusts to the real service.
On-Line Profiling and Modelling The on-line profiling and modelling stage 8 (in other words the model generating stage or automaton for model generation) is shown as a finite state machine in FIG. 2. FIG. 2 will now be described below where we describe within parentheses the name of the transition from one state to another.

As shown in FIG. 2, when the automaton is started and ready (START), the automaton moves to the System Identification (SID) state and phase 1, namely on-line profiling and modelling, is started by invoking the injection of a workload (INJECT||REINJECT) that moves the automaton to the injector state. The automaton waits (INJECTOR_WAIT) for the injector to be ready until the workload is actually being injected (TGEN_OK) and then goes back to the SID state. From there, SID passes to the monitor state (COLLECT_METRICS) in order to wait for measurements that indicate the system reaction to the injected workload. When new data samples arrive, the automaton goes back (NEW_METERS) to SID. This logic is repeated until an arbitrary number of samples N have been collected (N depends on the specific algorithm use to derive the service model from the collected metrics). Not all the metrics are modelled as this would cause excessive and unnecessary complexity. Only relevant metrics are considered by analyzing their variation with the workload (e.g. those with more correlated variation and higher relevance).

SID computes the model of a particular metric for each combination of {virtual network function (VNF), workload, model family (ARX, ARMAX, etc.)}. In this way, the model is improved and updated on-line after N samples have been collected during the execution of the input workload.

The process is repeated for an arbitrary number of workloads and the outcome of phase 1 consists of a number of models that are function of such workloads. Therefore, an INJECT_NEXT transition is generated at the end of each workload until all the workloads have been executed.

It is important to note that if the limit of any instance (saturation or bottleneck) is reached during the execution of a workload, the automaton transitions (SYS_LIMIT) from SID to the dependencies state. Here, the automaton stores the amount of load that the bottlenecked instance was able to handle before reaching such bottleneck, and which instance became saturated so as to cause the bottleneck. In addition, it also stores the amount of Cloud instances of each VNF type as well as information of the Cloud instances' resource usage for this amount of load. This information is later used to scale the system with the right number of instances. After updating the dependencies (DEP_UPDATED) the logic returns to SID and the VNF(s) that caused the bottleneck is scaled, see SCALE transition towards the scaling state. The automaton waits for the scaling operation to finish (SCALING_WAIT), stores information such as the time it takes for the scaling VNF to scale, and returns to SID (SCALE_READY). Once back to SID, it will ask to REINJECT the current workload or to INJECT the next one.

Model Optimisation and Reduction

As also shown in FIG. 2, once all the workloads have been run, the automaton transitions (OPTIMIZE) to the Model Optimisation and Reduction (MOR) state. Here, phase 2, namely the model optimisation and reduction stage, starts and the models are reduced and generalized (REDUCE_MODELS) in the redux state. The input of redux is a model for each combination of {Family_model, traffic_type, workload, VNF, selected_metrics}. Redux combines the different metrics per workload and VNF, reducing the number of models to the combinations of {Family_model, traffic_type, VNF}. That is, the automaton attempts to find a model (or a reduced number of models) for all types of traffic.

As also shown in FIG. 2, the next step is choosing the final model per VNF and type of traffic. The framework moves to eval (EVAL_MODELS) state. Here, the framework uses the second set of workloads to validate and choose the final model per VNF. The automaton moves iteratively between eval, injector, monitor and scale, while these workloads are being injected, samples are collected and the system is scaled when bottlenecks (limits) occur. Once all the workloads have been injected, the framework performs a comparison between the samples collected and the results obtained by the different models to find the model with the smallest error (e.g. the one with the lowest Mean Absolute Percentage Error, MAPE) per VNF and a transition (MODELS_READY) is generated to indicate the end of phase 2.

Interference Modelling

Phase 3 (namely interference modelling) of the automaton is aimed at finding the interferences produced by heterogeneous workloads i.e. mixes and combinations of individual workloads of various traffic types. As a result, the automaton will determine whether the service and its VNFs can be modelled as the aggregation of the models obtained for the various traffic types or a corrective factor is required. The automaton will move iteratively between interf, injector, monitor and scale while the heterogeneous workloads are injected, samples are collected and the service scaled when required. After different workloads combination or mixes have been injected, a comparison between the observed samples and the expected results from the models is performed. These results will rule whether a corrective factor is required on any VNF for any combination of workloads. Once these factors have been computed, a transition (INTERF_READY) returns the automaton to MOR and finishes Phase 3.

Operation Controller for Model-Based Operation

Here the automaton has learnt a model, and it is able to operate the system automatically in the model-based operation phase (phase 4). Referring back to FIG. 1, the operation is accomplished by an independent operation automaton 14 (namely in the operation controller 6). The finite state machine designed to control/operate the service is shown in FIG. 3.

Figure 3:
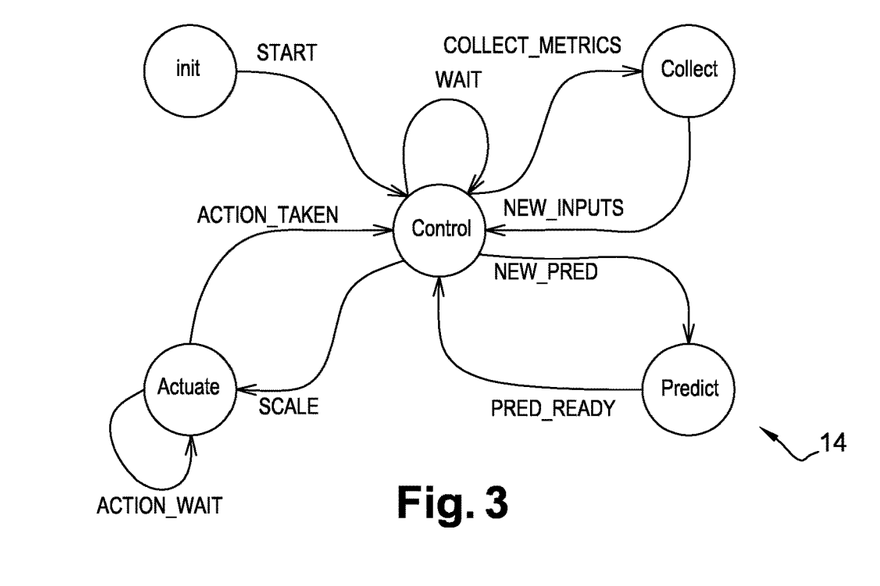
FIG. 3 is a finite state machine diagram illustrating in more detail the operation controller of the control system shown in FIG. 1.

As shown in FIG. 3, the operation automaton 14 requires the following inputs: i) the system and service metrics used during the modelling phase; and ii) the departure and traffic rates of the service. This information is required in order to actuate dynamically on the service with enough time in advance.

The operation automaton 14 moves to the control state (START) from init state, when the model and the service itself are ready. First, the automaton 14 moves to collect (COLLECT_METRICS) state, where service metrics and the current incoming and departure rates for each type of traffic are collected and sent to control (NEW_INPUTS). The operation needs to take actions ahead of time, moving to prediction (NEW_PRED) state it looks for a prediction of the amount of load that the service should expect in a time T. This prediction is based on time series analysis of the input and departure rates during the last K timeslots. The time T that the operation automaton looks ahead can be computed as $T=\max(T_i)+t$, being $\max(T_i)$ the maximum time the framework needs to instantiate an instance of a VNF; and t some extra manoeuvring time that can be set up by the user. Once the prediction is computed, the automaton 14 goes back to control (PRED_READY). With the current metrics of the service and the service model, the operation automaton 14 calculates the number of instances of each VNF needed to serve the predicted load. The number of Cloud instances of each VNF is computed by using the model and the amount of expected load. Then, the resulting number of Cloud instances is enough to ensure that the service remains inside the limits of expected behaviour of the operational area. If any instance is to be added or removed, the operation automaton 14 moves to actuate (SCALE) state and undertakes the orchestration action that is needed (scale out, down). The automaton 14 then waits for this action to be completed (ACTION_WAIT), and moves back to control (ACTION_TAKEN). Finally, the operation automaton 14 waits for the next timeslot (WAIT), where the next iteration of the control loop will take place.

Example Application: IP Multimedia Subsystem (IMS) Example

Figure 4:
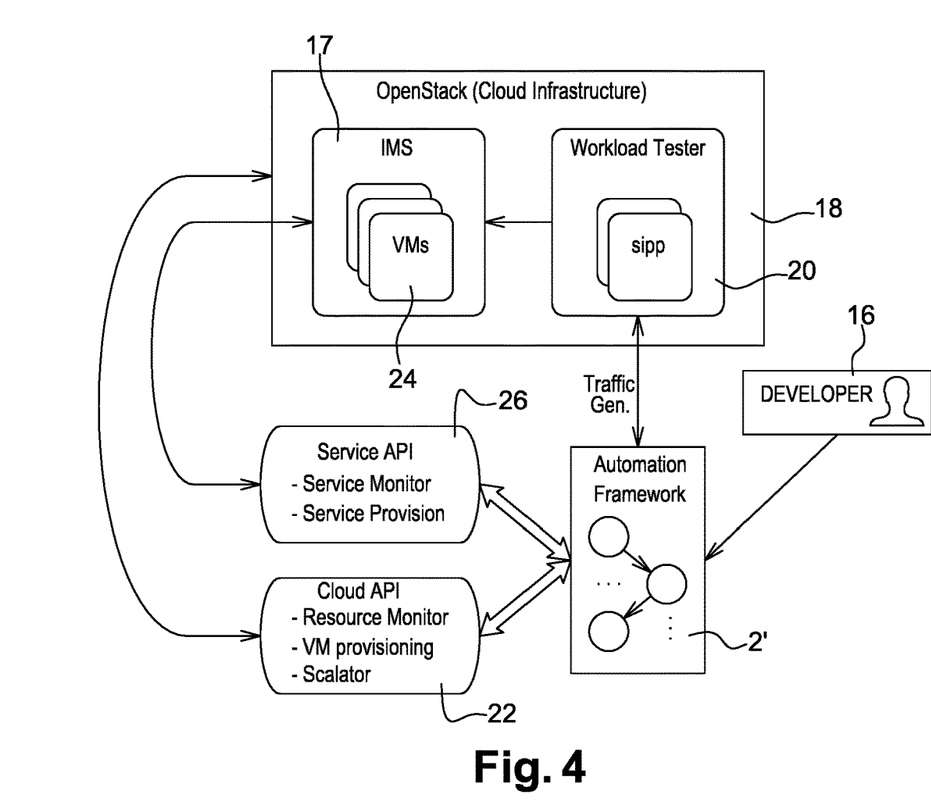
FIG. 4 is a diagram illustrating an example IP (Internet Protocol) Multimedia Subsystem (IMS) network within which the controller system shown in FIG. 1 is used.

An example of the automation framework in use is shown in the FIG. 4.

As shown in FIG. 4, a given user 16 (a telecom operator or developer in this example) wants to deploy a service (for example IP Multimedia Subsystem, IMS) 17 in the Cloud Infrastructure 18.

Referring to FIG. 4, the automation framework 2' requests the developer 16 to provide basic information about the service(s) he wants to deploy, namely: workload types (e.g., audio, video traffic or instant messages in the IMS example), virtual network functions, VNFs (e.g., Call Server, Packet Interface Module, SCM, etc.), and Service Level Agreements, SLAs (for example as to in what circumstances 'service unavailable' responses (e.g. error code "503") might be expected due to overload and which metrics of quality of service are to be used corresponding to the SLAs). With this basic information, the framework generates a set of traffic workloads for the profiling experiments to be performed, initially one workload per traffic type. Then, for each workload, the automation framework 2' performs an orientated profiling and modelling of the service as described above. This is done in this example by using a dedicated workload tester (or workload generator) 20 as shown in FIG. 4. For example, workload is increased and the indicators of 'service unavailable' ("503" errors) for example are monitored to understand whether a limit has been reached. In other similar examples, existing production data relating to traffic, and/or historical data, may be used.

The automation framework 2' connects to the Service and Cloud application programming interface (API'S). The framework uses those APIs in order to:

i) collect resources metrics (e.g. CPU, MEM, Disk, network), as well as service metrics (e.g., 503 responses and number of processed calls) related to quality of service, for example as defined in Service Level Agreements (SLAs)—this information is used during the creation of models that relate workload to resource utilization;

ii) once the models are created, reduced and evaluated, the operation controller 6 of the automation framework 2' acts to communicate to a Cloud Application Programming Interface (API) 22 in order to adjust ("right-size", "scale", "grow/de-grow") the amount of Cloud resources, for example the number of Cloud entities (for example Virtual Machines (VMs) or containers), needed to handle the incoming traffic in the model-based operation 14 (phase 4) as described in the previous section. This process determine the amount of resources required by the service in order to provide the correct quality of service, in other words to meet the agreed SLAs, for any arrival rate, and then, perform scalability operations with enough time in advance so that the new Cloud entities 24 (for example virtual machines, VMs) are up and running before the resources in the service are exhausted, minimizing SLA violations.

Let us consider the flow of information in the scenario in which the developer 16 wants to deploy an IMS service into a Cloud infrastructure 18. The automation framework 2' can be considered to have the four stages 8,10,12,14 shown in FIG. 1, in other words be divided into four phases as described above. Additionally, more specifically in this example the following applies.

In the on-line profiling and modelling stage (in other words in phase1), various models are created for each of the service's traffic types (previously requested by/for the user). For example, traffic types of messaging, audio, and video are considered. During this phase, the framework 2' generates several workloads for each traffic type and communicates to the workload tester 20 that is in charge of injecting/reinjecting the workload to the service. Once the workload is injected, the framework '2 then communicates to the Cloud Infrastructure 18 and service APIs 26 in order to monitor resource and service metrics. These metrics are used for the creation of online models that relate each metric to the input workload.

In the model optimisation and reduction stage (in other words phase 2), the framework 2' evaluates the different models created and selects the most accurate one by comparing their Mean Absolute Percentage Error, MAPE (which is a known formula to analyze the error of the model).

In the Interference Modelling stage, in other words phase 3, a new set of workloads are injected, where, in this case, the workloads are composed of various traffic mixes with the intention of capturing the interference when different proportions of traffic types are injected into the service at the same time, similar to Phase1. In this phase, the framework 2' also connects to the Cloud 18 and the service APIs 26 in order to enrich and validate the model defined in Phase 2 with an interference factor.

Finally, in the model-based operations stage, in other words phase 4, the model that has been created is used to calculate the arrival rate of the traffic mix to dynamically calculate the amount of Cloud entities 24 needed to cope with that traffic. Additionally in this phase, the automation framework 2' constantly performs a model validation in the background to catch new model aspects that come from unknown traffic.

Some Other Examples

Instead of IMS, some other examples could be for cloudified services of the following types: Content Distribution Networks, oneApp, other multitier services (e.g. traditional web-based services).

The present invention may be embodied in other specific forms without departing from its essential characteristics. For example, the automation framework may be deployed within an application. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods could be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A controller for a cloud based service handling multiple types of traffic in a telecommunications network, the controller comprising:
   at least one processor; and
   at least one memory including computer program code,
      the at least one memory and the computer program code configured to, with the at least one processor, cause the controller to:

automatically model use of cloud resources allocated to the service for specific workloads of each of a plurality of traffic types thereby providing a plurality of workload-specific models for each traffic type in which said traffic types comprise messaging, audio and video traffic types;

automatically generalise the workload-specific models thereby providing generalised models for each traffic type, generalized in being applicable to other workloads than the specific workloads;

automatically evaluate accuracy of the generalised models for various combinations of given workloads, in each combination each of the given workloads being of a different corresponding one of said traffic types, and to select one of the generalised models dependent upon evaluated accuracy; and control operation of the cloud resources according to predictions provided by the selected model.

2. The controller according to claim 1, wherein the at least one memory and the computer program code are further configured to, with the at least one processor, cause the controller to adapt the selected model by at least one correction factor dependent on the combinations of workloads.

3. The controller according to claim 1, wherein the at least one memory and the computer program code are further configured to, with the at least one processor, cause the controller to identify workload ranges within which the service operates without additional cloud resources.

4. The controller according to claim 1, wherein the at least one memory and the computer program code are further configured to, with the at least one processor, cause the controller to instruct adjustment of the cloud resources provided by cloud entities for the service dependent upon workloads anticipated for the service predicted by the selected model.

5. The controller according to claim 4, in which in operating the cloud resources the at least one memory and the computer program code are further configured to, with the at least one processor, cause the controller to instruct adjustment of the cloud resources provided by the cloud entities for the service dependent upon the selected model and the workloads anticipated for the service predicted by the selected model.

6. The controller according to claim 4, wherein the at least one memory and the computer program code are further configured to, with the at least one processor, cause the controller to instruct adjustment of the cloud resources by instructing at least one of increasing resources assigned to cloud entities and increasing the number of cloud entities, or at least one of decreasing resources assigned to cloud entities and decreasing the number of cloud entities.

7. The controller according to claim 6, wherein the at least one memory and the computer program code are further configured to, with the at least one processor, cause the controller to instruct at least one of increasing resources assigned to cloud entities and increasing the number of cloud entities, in the event that a throughput bottleneck is anticipated for the service.

8. The controller according to claim 1, wherein the service is provided by virtual network functions (VNFs), each having at least one corresponding cloud entity.

9. The controller according to claim 1, in which the controller is configured to be communicatively connected to an associated workload tester and wherein the at least one memory and the computer program code are further configured to, with the at least one processor, cause the controller to control the workload tester to apply workloads to the cloud resources and send data to the controller.

10. The controller according to claim 1, in which the controller uses resource data and service data to provide the models which relate workload to cloud resource usage.

11. The controller according to claim 10, in which the resource data comprises at least some of processor utilisation, memory utilisation, disk space, and network configuration; and the service data comprises at least one of number of error messages indicating overload in a period and number of calls processed in a period.

12. The controller according to claim 10, wherein the at least one memory and the computer program code are further configured to, with the at least one processor, cause the controller to receive the resource and service data from at least one or both of, a cloud application programming interface and a service application programming interface, to adapt the reduced number of generalised models to provide the selected model.

13. The controller according to claim 1, in which the service is an Internet Protocol, IP, Multimedia Subsystem, IMS, service.

14. A method of providing a cloud based service handling multiple types of traffic in a telecommunications network, the method comprising:

automatically modelling use of cloud resources allocated to the service for specific workloads of respective ones of a plurality of traffic types thereby providing a variety of workload-specific models for the respective traffic types wherein said respective traffic types comprise messaging, audio and video traffic types;

automatically, generalising the models, thereby providing generalised models for each traffic type, generalized in being applicable to other workloads than the specific workloads;

automatically evaluating accuracy of the generalised models for various combinations of given workloads, in each combination each of the given workloads being of a different corresponding one of said traffic types, and selecting one of the generalised models dependent upon evaluated accuracy; and operating the cloud resources according to predictions provided by the selected model.

\* \* \* \* \*